United States Patent
Santan et al.

(10) Patent No.: US 10,216,217 B1
(45) Date of Patent: Feb. 26, 2019

(54) ADAPTIVE COMPILATION AND EXECUTION FOR HARDWARE ACCELERATION

(71) Applicant: Xilinx, Inc., San Jose, CA (US)

(72) Inventors: Sonal Santan, San Jose, CA (US); Sudipto Chakraborty, Longmont, CO (US); Fei Rui, Boulder, CO (US); Stephen P. Rozum, Loveland, CO (US); Yenpang Lin, Campbell, CA (US); Yau-Tsun S. Li, Cupertino, CA (US); Sumit Roy, San Jose, CA (US)

(73) Assignee: XILINX, INC., San Jose, CA (US)

(*) Notice: Subject to any disclaimer, the term of this patent is extended or adjusted under 35 U.S.C. 154(b) by 159 days.

(21) Appl. No.: 15/382,390

(22) Filed: Dec. 16, 2016

(51) Int. Cl.
*G06F 1/00* (2006.01)
*G06F 1/08* (2006.01)

(52) U.S. Cl.
CPC ...................... *G06F 1/08* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 9,218,443 B1 | 12/2015 | Santan et al. | |
| 2004/0088592 A1* | 5/2004 | Rizzo | G06F 1/08 713/322 |
| 2005/0138582 A1* | 6/2005 | So | G06F 17/5022 714/30 |
| 2009/0307520 A1* | 12/2009 | Anselmi | G06F 1/12 713/600 |

OTHER PUBLICATIONS

Specification and drawings for U.S. Appl. No. 15/160,993, filed May 20, 2016, Santan et al.
Specification and drawings for U.S. Appl. No. 14/857,634, filed Sep. 17, 2015, Puthana et al.
Xilinx, "Vivado Design Suite User Guide," UG909 (v2015.1), Apr. 1, 2015, pp. 1-100, Xilinx, Inc., San Jose, California, USA.
Xilinx, "Clocking Wizard v5.1, LogiCORE IP Product Guide," PG065, Apr. 1, 2015, pp. 1-58, Xilinx, Inc., San Jose, California, USA.

\* cited by examiner

*Primary Examiner* — Zahid Choudhury
(74) *Attorney, Agent, or Firm* — Kevin T. Cuenot (57) ABSTRACT

Hardware acceleration for a kernel can include selecting, using a processor, a kernel, determining, using the processor, a clock frequency for the selected kernel, and programming, using the processor, a clock circuit to generate a clock signal having a clock frequency compatible with the clock frequency of the selected kernel. Using the processor, the selected kernel can be implemented as a kernel circuit within a region of programmable circuitry. The kernel circuit can be clocked using the clock signal from the clock circuit having the compatible clock frequency.

20 Claims, 5 Drawing Sheets

ADAPTIVE COMPILATION AND EXECUTION FOR HARDWARE ACCELERATION

TECHNICAL FIELD

This disclosure relates to hardware acceleration and, more particularly, to adaptive compilation of kernels for hardware acceleration and adaptive execution of the accelerated kernels.

BACKGROUND

Some modern computer programs are adapted to execute on heterogeneous computing platforms (platforms) that include a host processor and one or more devices. The host processor is often a central processing unit (CPU) while the devices may be graphics processing unit(s) (GPUs), digital signal processor(s) (DSPs), programmable integrated circuits (ICs), and so forth. Such computer programs typically include a portion that executes on the host processor and one or more other portions, called kernels, that are implemented on the devices.

In some cases, kernels are compiled into executable program code for execution by devices such as DSPs, GPUs, and so forth. In other cases, kernels are hardware accelerated by being compiled into circuitry. The kernel circuit is implemented within an IC. The kernel circuit is functionally equivalent to an executable version of the kernel. A circuit design specifying the kernel circuit is loaded into a programmable IC, for example, thereby implementing the kernel circuitry in hardware.

Often, kernel designers are software developers or have software development backgrounds. The kernels are coded using a high level programming language (HLL). In the software development realm, one expects compilation of HLL source code into executable program code to succeed presuming correct syntax. Such is the case despite any inefficiencies in the kernel design itself. By comparison, compilation of HLL source code into a circuit design may fail for any number of different reasons that may be unrelated to whether the HLL source code is syntactically correct. The inability to meet a timing constraint is one example of a hardware compiler failing to successfully compile a kernel. Unfortunately, many software developers are unfamiliar with the types of errors generated by hardware compilers and unable to address such errors.

SUMMARY

One or more embodiments are directed to methods of hardware acceleration. In one aspect, a method can include selecting, using a processor, a kernel, determining, using the processor, a clock frequency for the selected kernel, and programming, using the processor, a clock circuit to generate a clock signal having a clock frequency compatible with the selected kernel. The method can include implementing, using the processor, the selected kernel as a kernel circuit within a region of programmable circuitry, wherein the kernel circuit is clocked using the clock signal from the clock circuit having the compatible clock frequency.

One or more embodiments are directed to systems for hardware acceleration. In one aspect, a system includes a region of programmable circuitry, a clock circuit configured to provide a clock signal to the region of programmable circuitry, and a processor configured to select a kernel and determine the clock frequency for the selected kernel. The processor may also be configured to implement the selected kernel within the programmable circuitry as a kernel circuit and program the clock circuit to generate the clock signal with a clock frequency compatible with the selected kernel for use in clocking the kernel circuit.

One or more embodiments are directed to computer program products. In one aspect, a computer program product includes a computer readable storage medium having program code stored thereon. The program code is executable by a processor to perform operations including selecting, using the processor, a kernel, determining, using the processor, a clock frequency for the selected kernel, and programming, using the processor, a clock circuit to generate a clock signal having a clock frequency compatible with the selected kernel. The operations can include implementing, using the processor, the selected kernel within a region of programmable circuitry as a kernel circuit, wherein the kernel circuit is clocked using the clock signal from the clock circuit having the compatible clock frequency.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to hardware acceleration and, more particularly, to adaptive compilation of kernels for hardware acceleration and adaptive execution of the accelerated kernels. In one or more embodiments, kernels written in a high level programming language (HLL) may be compiled into kernel circuit designs that may be implemented within one or more devices of a heterogeneous computing platform (platform). The kernel circuit designs are implemented within the device(s) as kernel circuits. The device may be an integrated circuit (IC) such as a programmable IC that is adapted for operation as a device operatively coupled to a host processor of the platform.

As the kernels are compiled, a clock frequency for the kernel circuit may be determined and stored in association with the resulting kernel circuit design. The clock frequency for each of two or more different kernel circuits usable by a given host processor may differ. In one or more embodiments, the host processor of the platform is capable of determining the clock frequency of the kernel circuit that is to be implemented using a device and configure the device to provide a clock signal that is compatible with the clock frequency needed by the kernel circuit. The host processor may vary the clock frequency of the clock signal provided to one or more regions of circuitry within the device(s) based upon the needs and/or requirements of the particular kernel circuit(s) implemented within such regions during runtime.

In one or more other embodiments, the host processor is capable of determining a level of usage of a kernel circuit implemented within a device. In response to determining that the level of usage of the kernel circuit falls below a threshold level of usage, the host processor is capable of lowering the clock frequency of the clock signal provided to the kernel circuit in order to reduce power consumption. In one example, the host processor is capable of lowering the frequency of the clock signal to the kernel circuit so as to place the kernel circuit into a "sleep" or "low power mode" of operation.

One or more embodiments described herein may be implemented as a method or process performed by a data processing system. One or more other embodiments described herein may be implemented as a system such as a data processing system, an IC, an SOC type of IC, and so forth. One or more other embodiments described herein may be implemented as a non-transitory computer-readable storage medium storing program code that, when executed, causes a processor and/or a system to perform and/or initiate the operations described within this disclosure.

These and other aspects of the inventive arrangements are described in greater detail below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
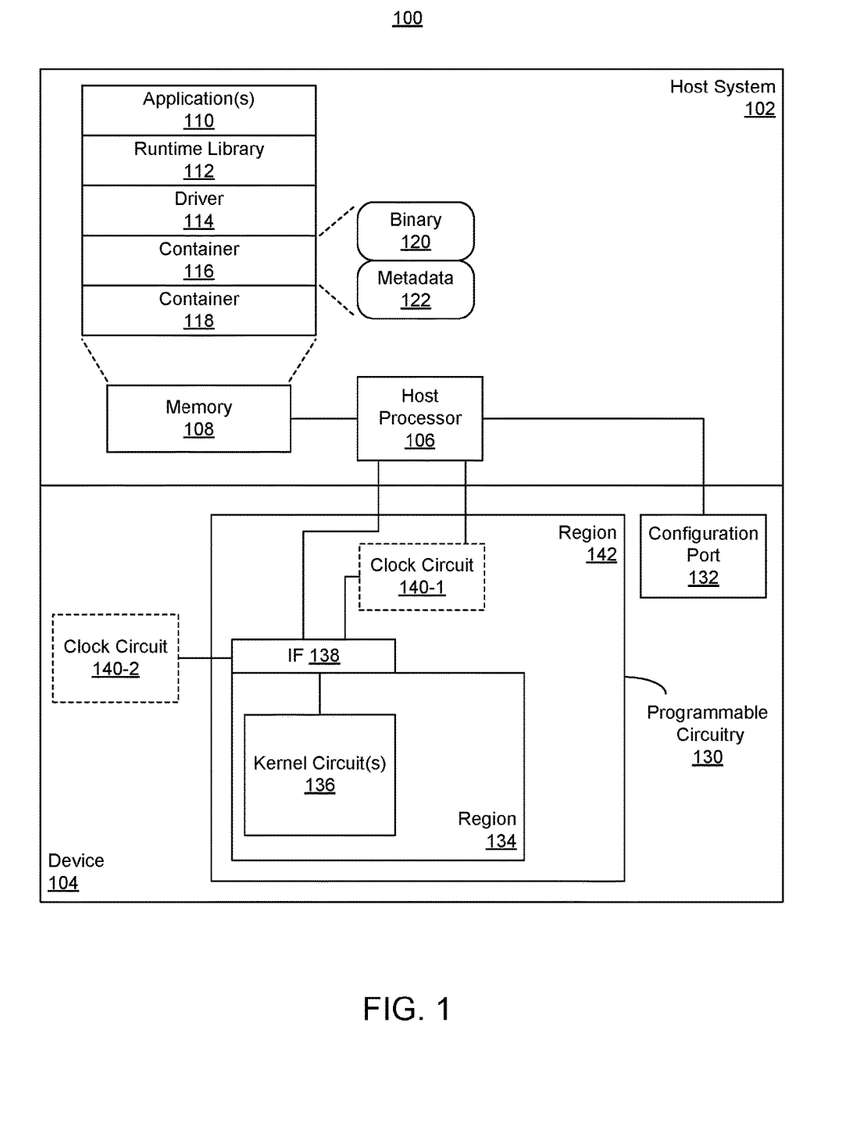
FIG. 1 illustrates an example heterogeneous computing platform.

FIG. 1 illustrates an example heterogeneous computing platform (platform) 100. Platform 100 includes a host system 102 and a device 104. In one or more embodiments, platform 100 is implemented with host system 102 being separate from device 104. Host system 102 can be implemented as a data processing system such as a server or other computing system. Device 104 can be implemented as a programmable IC. For example, the programmable IC may be implemented as a field programmable gate array (FPGA). Device 104 may be mounted on a circuit board that is communicatively linked with host system 102. Device 104 may couple to host system 104 using Ethernet, Peripheral Component Interconnect Express (PCIe), or another suitable communication channel.

In one or more other embodiments, platform 100 may be implemented as a system-on-chip (SOC). An SOC is an IC that includes a processor that executes program code and one or more other circuits. The other circuits may be implemented as hardwired circuitry, programmable circuitry, and/or a combination thereof. The circuits may operate cooperatively with one another and/or with the processor. In the example of FIG. 1, the other circuits include programmable circuitry while host system 102 is hardwired. In one or more embodiments, host system 102 and device 104 are implemented on a same die.

Host system 102 includes a host processor 106 and a memory 108 operatively coupled to host processor 106. In one or more embodiments, where platform 100 is implemented as an SOC, memory 108 may be implemented off-chip from the SOC as external random access memory (RAM). In that case, for example, host system 102 may include a memory controller (not shown) that is configured to access memory 108. In one or more other embodiments, where host system 102 is a data processing system, memory 108 may include volatile memory such as RAM and/or non-volatile memory such as a bulk storage device.

Memory 108 may store one or more applications 110 that are executable by host processor 106, a runtime library 112, and a driver 114. Memory 108 further is capable of storing one or more containers 116 and 118. Runtime library 112 includes program code that facilitates configuration of device 104 by host processor 106. Runtime library 112, for example, allows host processor 106 to configure control registers of device 104, load binaries into configuration port 132 of device 104, isolate and de-isolate region 134, reset device 104, and perform these and/or other functions in real time as needed.

Driver 114 includes program code that facilitates programming of clock circuit 140-1 and/or clock circuit 140-2 by host processor 106 to generate one or more clock signals each with a particular clock frequency. For example, driver 114 facilitates determination of a compatible clock frequency for a kernel circuit that may be generated by the clock circuit 140. In one or more embodiments, driver 114 is implemented as a "kernel mode" driver. Unlike user mode drivers, kernel mode drivers share a single virtual address space. Accordingly, a kernel mode driver is not isolated from other drivers and/or from the operating system itself so as to allow efficient passing of data and operation.

Containers 116 and 118 are files that are adapted to include multiple components or files. In the example of FIG. 1, containers 116 and 118 each include a binary (e.g., a binary file) and metadata (e.g., a metadata file). For purposes of illustration, contents of container 116 are shown to include binary 120 and metadata 122. In one or more embodiments, the binary within each container is a configuration bitstream that specifies a kernel circuit design. The kernel circuit design may be implemented within device 104 to implement a kernel circuit, e.g., kernel circuit 136.

The metadata within each container specifies one or more attributes relating to the binary of the same container. In one example, the metadata specifies a particular clock frequency at which the binary is intended to operate. The clock frequency may be a preferred or a maximum clock frequency at which the kernel circuit specified by the binary may operate. Host processor 106, in executing driver 114, is capable of programming one or more attributes of the metadata from a container into clock circuit 140-1 and/or clock circuit 140-2.

Device 104 includes programmable circuitry 130 and configuration port 132. Programmable circuitry 130 includes a region 134 that is adapted to implement one or more different kernel circuits 136. In one or more embodiments, region 134 is dynamically configurable. For example, device 104 is capable of supporting partial reconfiguration using region 134. Partial Reconfiguration is a process where a region, e.g., region 134, of programmable circuitry of an IC may be dynamically configured, or re-configured, by loading a partial configuration bitstream into the IC during runtime and/or in real time. The partial configuration bitstream, for example, may specify different circuitry and/or a different system (e.g., a different kernel circuit) than previously implemented in the region. The region may undergo modification through partial reconfiguration while other regions of programmable circuitry 130, e.g., region 142, continue to operate without interruption.

Thus, within region 134, different kernels obtained from different containers may be implemented at different times during operation of device 104, e.g., during runtime and/or in real time. Host processor 106 is capable of controlling implementation of different kernels within region 134. The regions of programmable circuitry 130 external to region 134, e.g., region 142, may be considered static circuitry. While programmable circuitry 130 is configured by loading a configuration bitstream, circuitry in region 142 that is outside of region 134 remains intact and/or operational while region 134 is configured to implement a new and/or different kernel.

An interface 138 may be included through which host processor 106 and/or clock circuit(s) 140 communicate with region 134 and any kernel circuit(s) implemented therein. In one or more embodiments, data signals, clock signals, and/or other control signals may be propagated through interface 138. In one example, interface 138 is implemented as an AMBA eXtensible Interface (AXI) bus and/or endpoint. An AXI bus is an embedded microcontroller bus interface for use in establishing on-chip connections between circuit blocks and/or systems.

In one embodiment, clock circuit 140 is implemented as clock circuit 140-1 in programmable circuitry 130. In that case, clock circuit 140-1 is considered part of the static circuitry of programmable circuitry 130. In another embodiment, clock circuit 140 is implemented as clock circuit 140-2 as hardwired circuitry. In either case, clock circuit 140 is programmed by host processor 106 in executing driver 114 to generate a clock signal of a selected frequency that is compatible with the clock frequency needed by kernel circuit(s) 136.

Host processor 106 is also capable of controlling interface 138 to effectively isolate region 134 and de-isolate region 134 as needed. In one or more embodiments, interface 138 includes isolation logic that is controllable by host processor 106. For example, host processor 106 may provide instructions to interface 138 to disable signal paths into and out from region 134. Responsive to such an instruction from host processor 106, interface 138 may hold signals such as data signals, clock signals, and/or control signals at a constant value or state thereby isolating region 134 from other portions of programmable circuitry 130 such as region 142. Responsive to a further instruction from host processor 106, interface 138 is capable of enabling the signal paths so that the signals are no longer held in a constant state and are allowed to fluctuate and/or propagate into and out from region 134, thereby de-isolating region 134.

In one or more embodiments, host processor 106 is capable executing runtime 112 to obtain a container such as container 116 and read metadata 122 therein. Host processor 106 is capable of determining a clock frequency for binary 120 from metadata 122. Binary 120, in one example, is a configuration bitstream specifying kernel circuit 136. Executing runtime 112, host processor 106 is capable of instructing interface 138 to isolate region 134, which may have no kernel circuit implemented therein or a kernel circuit different from kernel 136 implemented therein at least initially.

With region 134 isolated, host processor 106 is capable of executing driver 114 to program clock circuit 140 to generate a clock frequency that is compatible with the clock frequency read from metadata 122. Host processor 106 further may execute runtime 112 to provide binary 120 to configuration port 132 so that binary 120 is loaded into configuration memory cells (not shown) of device 104 thereby implementing kernel circuit 136 within region 134. Subsequent to programming of clock circuit 140 and implementation of kernel circuit 136 in region 134, host processor 106 submits an instruction to interface 138 to de-isolate region 134. Kernel circuit 136 is operational to perform hardware accelerated functions within device 104.

In one or more embodiments, clock circuit 140 is programmable to provide one or more than one clock signal to region 134 and to the kernel circuit(s) 136 implemented therein. For example, a single kernel may be operable to receive more than one clock signal. In another example, two or more kernels may be implemented in region 134 where each kernel is capable of receiving one or more clock signals. In this regard, more than one instance of clock circuit 140 may be included to facilitate generation of the number of clock signals needed for kernel circuit(s) 136. Each instance of clock circuit 140, for example, may be programmed by host processor 106 to generate one or more clock signals for kernel circuit(s) 136 where the generated clock signals have compatible frequencies (which may differ from one clock signal to another).

Platform 100 is shown for purposes of illustration. Other platforms that may be used with the embodiments described within this disclosure may include additional devices of the same and/or different varieties. As such, the particular number and/or type of devices included in the platform is not intended as a limitation.

Figure 2:
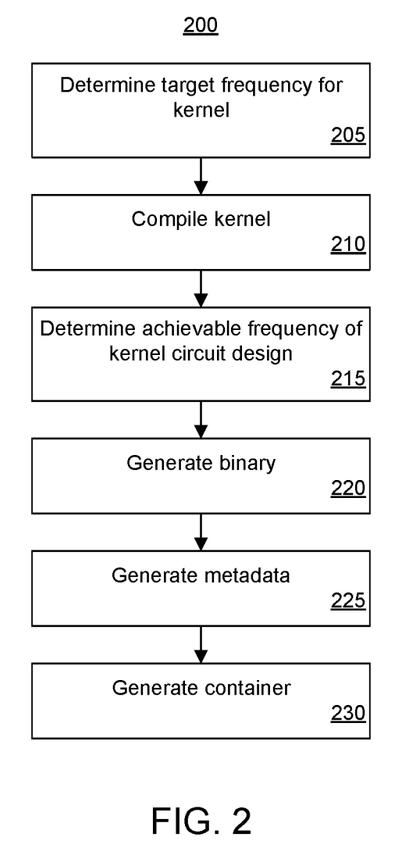
FIG. 2 illustrates an example method of generating a container.

FIG. 2 illustrates an example method 200 of generating a container. Method 200 may be performed by a data processing system executing hardware compilation program code. An example architecture for a data processing system suitable for executing a hardware compiler is described herein in greater detail in connection with FIG. 5.

In general, method 200 illustrates compilation of a kernel specified using HLL source code for implementation as a kernel circuit to support varied operating frequencies. Method 200 begins in a state where a user has specified a kernel in HLL source code as opposed to using a hardware description language such as Verilog and/or VHDL.

In block 205, the hardware compiler (e.g., a data processing system executing such a hardware compiler) determines the target clock frequency for the kernel. The target clock frequency may be specified in the source code file(s) being compiled, within a project file, as a directive, from a received user input, from another file, or through another method.

In block 210, the hardware compiler compiles the kernel. In one or more embodiments, the hardware compiler translates the HLL source code into a hardware description. The hardware compiler is capable of performing a design flow on the hardware description. A design flow typically includes multiple, different phases. These phases generally include synthesis, placement, and routing.

Synthesis refers to the process of converting, or translating, an abstract, programmatic description of a circuit into a low-level design implementation. The abstract, programmatic description of the circuit describes behavior of the circuit and is also referred to as a "behavioral description." The behavioral description may be specified as a "register transfer level (RTL) description" of the circuit and/or using a hardware description language (HDL). The low-level design implementation generated through synthesis typically is specified as inter-connected logic gates.

Synthesis may also include mapping. Mapping is the process of correlating, or matching, the logic gates of the low-level circuit design to the various types of physical circuit blocks that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned. Routing is the process of selecting particular routing resources such as wires, programmable interconnection points (PIPs), PIP settings, and/or other interconnect circuitry to electrically couple the various circuit blocks of the target IC after placement.

In block 215, the hardware compiler determines the achievable clock frequency of the compiled kernel, e.g., the kernel circuit design. In one or more embodiments, since routing information is available, the hardware compiler is capable of generating detailed delay information for signal paths of the kernel circuit design.

In one or more embodiments, the hardware compiler determines the achievable clock frequency of the circuit design based upon slack. The term "slack" refers to the difference between a required arrival time of a signal at a circuit element, e.g., a signal arriving at a load of a net from a source, and an estimated arrival time of the signal at the circuit element. A positive slack indicates that the signal path meets the timing requirement, or timing constraint, for the signal path. A negative slack indicates that the signal path does not meet the timing requirement for the signal path. The signal path is slower than the requirement for the signal path. The estimated arrival time of a signal to the load of the signal path is after the required arrival time (e.g., the requirement).

In one or more embodiments, the hardware compiler is capable of determining the achievable clock frequency for the kernel circuit design using an expression such as 1/(target clock frequency−slack). As an illustrative example, if the target clock frequency for the kernel circuit design is 300 MHz, signals need to propagate from sources to loads in approximately 3.33 nanoseconds in order to meet timing. If the slack is negative, e.g., −0.5 nanoseconds, the achievable clock frequency may be determined as $1/(3.33^{-8}+0.5^{-8})$. The hardware compiler may use any of a variety of available and/or known methods to determine the achievable clock frequency.

In one or more embodiments, the hardware compiler is configurable, e.g., via user preference, to compile the circuit design to operate at a clock frequency that is faster than the target clock frequency, if possible. In that case, the hardware compiler is operable to process the circuit design through the implementation flow and generate a kernel circuit design adapted to operate at a clock frequency that his higher than the target clock frequency. It should be appreciated, that whether the configuration option for the hardware compiler to generate a faster kernel circuit design, if possible, is selected or not, in some cases the kernel circuit design may only be able to meet timing. In still other cases, the kernel circuit design may not meet timing.

In the case where the kernel circuit design meets timing, the hardware compiler processes the kernel through the implementation flow to generate a kernel circuit design that is adapted to operate at the target clock frequency. In the case where the circuit design does not meet timing, the hardware compiler processes the kernel through the implementation flow to generate a kernel circuit design that is adapted to operate at a clock frequency that is lower than the target clock frequency. In one or more embodiments, in cases where timing is not met, the hardware compiler does not terminate the compilation process (the implementation flow), but rather completes compilation so that the resulting kernel circuit design is operable at a clock frequency that is lower than the target clock frequency. This feature provides the kernel designer with a functional, albeit slower, kernel circuit that may be implemented within a device rather than an un-compiled kernel and error messages indicating that the kernel may not be compiled due to timing not being met.

Though shown as a separate block, in or more embodiments block 215 is performed as part of block 210. In one example, block 210 is performed as an iterative process where the hardware compiler attempts to compile the circuit design one or more times and determines the achievable clock frequency of the kernel circuit design during the iteration(s).

In one or more embodiments, the kernel may include more than one clock domain. A target clock frequency may be specified for each clock domain of the kernel. The target clock frequency for each clock domain of a kernel may be the same or different. The hardware compiler is capable of performing the operations described herein to determine the achievable clock frequency for each such clock domain.

In block 220, the hardware compiler generates a binary. As discussed, in one or more embodiments the binary is a configuration bitstream specifying the kernel circuit design. For example, the hardware compiler may process the placed and routed kernel circuit design and generate a configuration bitstream that may be provided to a programmable IC and loaded therein to implement the kernel circuit.

In block 225, the hardware compiler generates metadata. In one or more embodiments the metadata is implemented as a file that specifies one or more attributes describing aspects of the binary. In one example, the metadata specifies the achievable clock frequency for the kernel circuit design now in binary form. The metadata may specify the achievable clock frequency for each clock domain of the kernel circuit design. The metadata may be implemented using any of a variety of different files and or data structures. For example, the metadata may be specified as a text file including suitable delimiters, as a markup language file, or the like.

In block 230, the hardware compiler generates a container. The hardware compiler is capable of including the binary and the metadata within a single file called the container. The container may be any of a variety of different known file types that are capable of including or wrapping one or more files therein. The container may include header data specifying an inventory of files and/or objects included therein.

Once generated, the container may be provided to, or stored within, memory operatively coupled to a host processor. During runtime of the host processor, the container and/or kernel specified by the binary contained within the container are available for use by the host processor and may be selected for implementation within a device as required. The host processor, for example, may execute one or more applications and, responsive to particular conditions and/or events, select the container and initiate the implementation of a kernel, as specified by the binary within the container, within a device on an as needed basis.

In one or more embodiments, the operations described with reference to FIG. 2 may be performed for each of a plurality of different kernels intended for implementation as kernel circuits. Each of a plurality of kernels for a given platform and/or device(s) within that platform may be processed independently through method 200. Though each of the kernels may have a same target clock frequency, the achievable clock frequency for each resulting kernel circuit design (and for each clock domain within each kernel circuit design) is independently determined. As such, the achievable clock frequency for each binary for a kernel circuit design, as specified within the metadata of the container for the binary, may be the same or differ, may be faster than the target clock frequency, may be slower than the target clock frequency, or the same as the target clock frequency. Similarly, the achievable clock frequency for each clock domain within a binary for a kernel circuit design, as specified within the metadata of the container for the binary, may be the same or differ, may be faster than the target clock frequency for the clock domain, may be slower than the target clock frequency for the clock domain, or the same as the target clock frequency for the clock domain.

Figure 3:
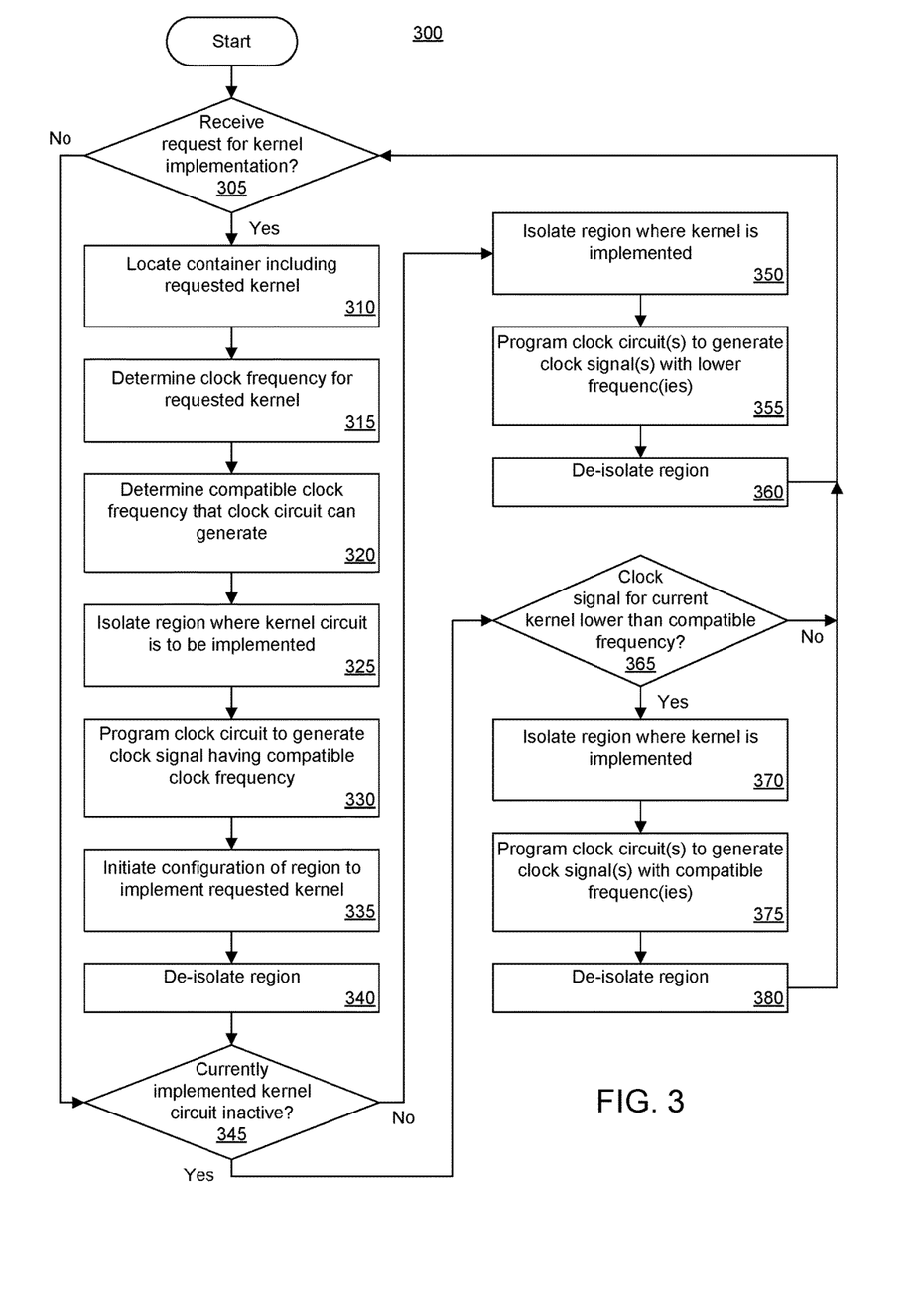
FIG. 3 illustrates an example method of operation for a platform.

FIG. 3 illustrates an example method 300 of operation for a platform. The platform may include a host system and one or more devices. For purposes of illustration, the device is a programmable IC. In one or more embodiments, the host system may be part of the programmable IC, e.g., as an SOC. In one or more other embodiments, the host system is implemented as a separate and independent system that is communicatively linked with the programmable IC, e.g., a data processing system.

Method 300 illustrates an example method of operation illustrating how the platform is adapted to accommodate for the varied operating frequencies of the kernels included therein dynamically during runtime. As discussed, the host system may include one or more different containers. The clock frequency for the binary within the containers may differ. The host system does not presume that the clock frequencies of the binaries for kernels are the same, but rather undertakes a process that accommodates for different clock frequencies for the various kernel circuits to be implemented. This allows kernel circuits that operate at clock frequencies that are higher or lower than the target clock frequency to be implemented, used, and operate within the platform.

In block 305, the host processor determines whether a request for kernel implementation is received. If so, method 300 continues to block 310. If not, method 300 proceeds to block 345.

In block 310, the host processor locates the container including the requested kernel. The host processor selects the container including the requested kernel, e.g., from among a plurality of such containers. In one or more embodiments, the received request may specify the particular container having the binary for the desired kernel. In one or more other embodiments, the host processor may maintain a data structure that correlates containers with kernels so as to locate the correct container.

In block 315, the host processor determines a clock frequency for the requested kernel. The host processor is capable of reading the metadata included in the container. The clock frequency for the kernel is specified within the metadata, e.g., as the achievable clock frequency for the binary. The host processor is capable of reading the clock frequency from the metadata. As discussed, the metadata may specify more than one clock frequency for the kernel. As such, the host processor is capable of reading each of the clock frequencies for the kernel from the metadata.

In block 320, the host processor determines a compatible clock frequency for the kernel circuit that the clock circuit can generate. In one or more embodiments, the compatible clock frequency is the same as the clock frequency for the kernel read from the metadata. In one or more other embodiments, the compatible clock frequency is different from the clock frequency of the kernel read from the metadata. For example, the compatible clock frequency may be lower.

In one or more embodiments, the clock circuit is capable of generating a clock signal with any of a plurality of different clock frequencies. Typically, these clock frequencies are within a range having an upper bound and a lower bound. The clock frequencies that may be generated may be separated by a delta frequency that is a predetermined number of Hz depending upon the particular implementation of the clock circuit.

The host processor is capable using a table of the clock frequencies that the clock circuit is capable of generating. In one or more embodiments, the host processor selects, from the table, the clock frequency that is closest to the clock frequency read from the metadata without exceeding the clock frequency read from the metadata. For example, if the metadata indicates that a binary is capable of operating at 187 MHz, but the clock circuit is capable of generating either 180 MHz or 190 MHz clock signals, the host processor selects 180 MHz as the compatible clock frequency.

In one or more embodiments, the host processor determines the compatible clock frequency for the binary through execution of the driver described herein. For example, the driver may include the necessary instructions and/or table data structures to determine the compatible clock frequency. The host processor, in executing the driver, may pass the driver the clock frequency read from the metadata. The driver may be adapted to determine the compatible clock frequency given the clock frequency obtained from the metadata and the tables and/or data structures described herein. The driver further may include the functions necessary to program the clock circuit.

In one or more embodiments where the kernel uses more than one clock signal, the host processor may perform operations as described to determine the compatible clock frequency for each such clock signal used by the kernel.

In block 325, the host processor isolates the region where the kernel is to be implemented. As discussed, the host processor is capable of issuing an instruction or instructions that cause the interface to the region, or the isolation logic included therein, to hold signals that pass between region 134 and region 142 constant. By isolating the region in which the kernel circuit is to be implemented, glitches in signals, including the clock signal, may be avoided while the clock signal is adjusted. Other potential instabilities relating to implementation of the kernel circuit within the designated region may also be avoided.

In block 330, the host processor programs the clock circuit to generate a clock signal having the compatible clock frequency determined in block 320. The host processor is capable of sending instructions to the clock circuit, e.g., writing data to a control register or the like, thereby causing the clock circuit to adjust or change the frequency of the clock signal being generated to that of the compatible clock frequency.

In one or more embodiments, the clock circuit is capable of generating more than one clock signal. Accordingly, the host processor is capable of programming the clock circuit to generate two or more clock signals for the kernel circuit, where each clock signal has a compatible clock frequency needed by the kernel circuit. In one or more other embodiments, the kernel circuit may require more clock signals than may be generated by a single clock circuit. In that case, the host processor is capable of programming more than one clock circuit to generate the necessary clock signals, wherein each clock signal has a compatible clock frequency needed by the kernel circuit.

In block 335, the host processor initiates configuration of the region within the device to implement the requested kernel. The host processor is capable of providing the binary read from the container to the device thereby initiating partial reconfiguration within the device to implement the desired kernel within the region. As discussed, in one or more embodiments, the host processor is able to provide the binary to the device for input via the configuration port of the device. In block 340, the host processor de-isolates the region.

Subsequent to block 340, the kernel circuit may begin operation under control of the host processor. For example, the host processor may provide data to the kernel circuit. The kernel circuit may operate on the data and provide any results obtained to the host processor.

In one or more embodiments, the host processor is capable of implementing a power savings strategy within the device. The host processor, responsive to particular conditions, may lower the clock frequency of the kernel circuit, thereby saving power. The host processor may initiate this process responsive to determining that the currently implemented kernel circuit is inactive. The kernel circuit may be considered inactive when not in use or after not having been used for at least a predetermined amount of time.

Thus, in block 345, the host processor determines whether the currently implemented kernel circuit within the region is inactive. If so, method 300 may continue to block 350. If not, method 300 proceeds to block 365.

Continuing with block 350, the host processor isolates the region in which the kernel circuit is implemented. In block 355, the host processor programs the clock circuit(s) to generate a clock signal (or clock signals as the case may be) with a lower clock frequency than the compatible clock frequency currently used to clock the kernel circuit within the now isolated region. In block 360, having reprogrammed the clock circuit, the host processor de-isolates the region that includes the kernel circuit. By programming the clock circuit to generate a clock signal with a lower frequency, the kernel circuit, and thus the device and platform, consumes less power.

In one or more embodiments, the lower clock frequency used may be significantly lower than the compatible clock frequency so as to implement a sleep mode for the kernel circuit. In one or more other embodiments, the lower clock frequency may be only one or two steps, or settings of the clock circuit, below the compatible clock frequency.

It should be appreciated that any of a variety of different conditions may be specified that, upon detection by the host processor, cause the host processor to lower the clock frequency of the clock signal generated by the clock circuit in order to save power. The inventive arrangements described within this disclosure are not intended to be limited by the particular conditions detected by the host processor that cause the lowering of the clock frequency of the clock signal.

Blocks 350, 355, and 360 are provided to illustrate that the frequency of the clock signal provided to the kernel circuit may be dynamically adjusted during operation of the device under control of the host processor. After block 360 method 300 may loop back to block 305 to continue processing.

Continuing with block 365, the host processor determines whether the clock signal for the kernel circuit currently implemented within the region is lower than the compatible clock frequency for the kernel circuit. If so, method 300 continues to block 370. If not, method 300 loops back to block 305 to continue processing.

In block 370, the host processor isolates the region where the kernel circuit is implemented. In block 375, the host processor programs the clock circuit to generate a clock signal with the compatible clock frequency for the kernel circuit. In one or more embodiments, the host processor may store the compatible clock frequency (or frequencies as the case may be) for a kernel in memory as part of the process for lowering the clock signal to the kernel circuit. In that case, the host processor may recall the compatible clock frequency by reading from the designated location in memory. In one or more other embodiments, the host processor may determine the compatible clock frequenc(ies) for the kernel circuit using the process previously described herein where the container including the binary and metadata for the kernel circuit is read. In block 380, the host processor de-isolates the region. After block 380, method 300 may loop back to block 305 to continue processing.

Figure 4:
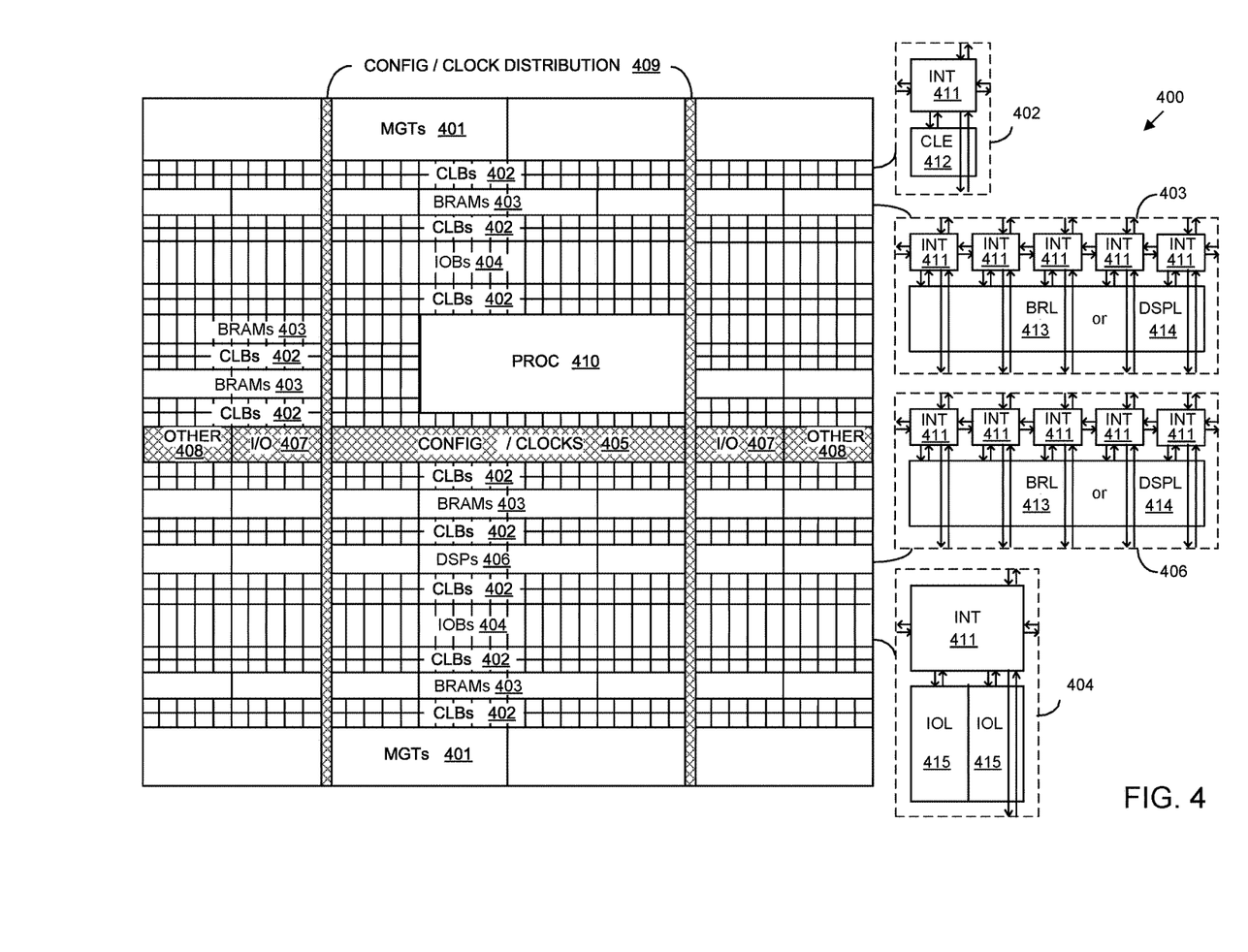
FIG. 4 illustrates an example architecture for an integrated circuit.

FIG. 4 illustrates an example architecture 400 for an IC. In one aspect, architecture 400 may be implemented within a programmable IC. For example, architecture 400 may be used to implement a field programmable gate array (FPGA). Architecture 400 may also be representative of an SOC. In one or more embodiments, an IC having architecture 400, or one similar thereto, may be used to implement device 104 of FIG. 1. In one or more other embodiments, an IC having architecture 400, or one similar thereto, may be used to implement host system 102 and device 104.

As shown, architecture 400 includes several different types of programmable circuit, e.g., logic, blocks. For example, architecture 400 may include a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized I/O blocks 407 (e.g., configuration ports, whether externally accessible and/or internally accessible, and clock ports), and other programmable logic 408 such as digital clock managers, analog-to-digital converters, system monitoring logic, and so forth.

In some ICs, each programmable tile includes a programmable interconnect element (INT) 411 having standardized connections to and from a corresponding INT 411 in each adjacent tile. Therefore, INTs 411, taken together, implement the programmable interconnect structure for the illustrated IC. Each INT 411 also includes the connections to and from the programmable logic element within the same tile, as shown by the examples included at the top of FIG. 4.

For example, a CLB 402 may include a configurable logic element (CLE) 412 that may be programmed to implement user logic plus a single INT 411. A BRAM 403 may include a BRAM logic element (BRL) 413 in addition to one or more INTs 411. Typically, the number of INTs 411 included in a tile depends on the height of the tile. As pictured, a BRAM tile has the same height as five CLBs, but other numbers (e.g., four) also may be used. A DSP tile 406 may include a DSP logic element (DSPL) 414 in addition to an appropriate number of INTs 411. An 10B 404 may include, for example, two instances of an I/O logic element (IOL) 415 in addition to one instance of an INT 411. The actual I/O pads connected to IOL 415 may not be confined to the area of IOL 415.

In the example pictured in FIG. 4, a columnar area near the center of the die, e.g., formed of regions 405, 407, and 408, may be used for configuration, clock, and other control logic. Horizontal areas 409 extending from this column may be used to distribute the clocks and configuration signals across the breadth of the programmable IC.

Some ICs utilizing the architecture illustrated in FIG. 4 include additional logic blocks that disrupt the regular columnar structure making up a large part of the IC. The additional logic blocks may be programmable blocks and/or dedicated circuitry. For example, a processor block depicted as PROC 410 spans several columns of CLBs and BRAMs.

In one aspect, PROC 410 may be implemented as dedicated circuitry, e.g., as a hardwired processor, that is fabricated as part of the die that implements the programmable circuitry of the IC. PROC 410 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 410 may be omitted from architecture 400 and replaced with one or more of the other varieties of the programmable blocks described. Further, such blocks may be utilized to form a "soft processor" in that the various blocks of programmable circuitry may be used to form a processor that can execute program code as is the case with PROC 410.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 4 that are external to PROC 410 such as CLBs 402 and BRAMs 403 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 410.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 410 or a soft processor. In some cases, architecture 400 includes a dedicated configuration processor that loads the configuration bitstream to the appropriate configuration memory and/or processor memory. The dedicated configuration processor does not execute user-specified program code. In other cases, architecture 400 may utilize PROC 410 to receive the configuration bitstream, load the configuration bitstream into appropriate configuration memory, and/or extract program code for execution.

FIG. 4 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 4 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 410 within the IC are for purposes of illustration only and are not intended as limitations.

In one or more embodiments, an IC implemented using architecture 400 or one similar thereto may be used to implement a device such as device 104 of FIG. 1. In one example, the IC may not include a processor such as PROC 410. In that case the IC may include a first region of programmable circuitry adapted to operate as a static region serving as an interface to a second region of programmable circuitry adapted for dynamic configuration in which one or more kernels may be implemented.

In another example, the IC may include a processor that is implemented from programmable circuitry that is capable of executing program code. In that case the processor implements the host processor 106 of FIG. 1. The IC may include a first region of programmable circuitry adapted to operate as a static region serving as an interface to a second region of programmable circuitry adapted for dynamic configuration in which one or more kernels may be implemented.

In still another example, the IC may include a hardwired processor and/or processor system that implements host system 102 and/or host processor 106. The IC may include a first region of programmable circuitry adapted to operate as a static region serving as an interface to a second region of programmable circuitry adapted for dynamic configuration in which one or more kernels may be implemented.

Figure 5:
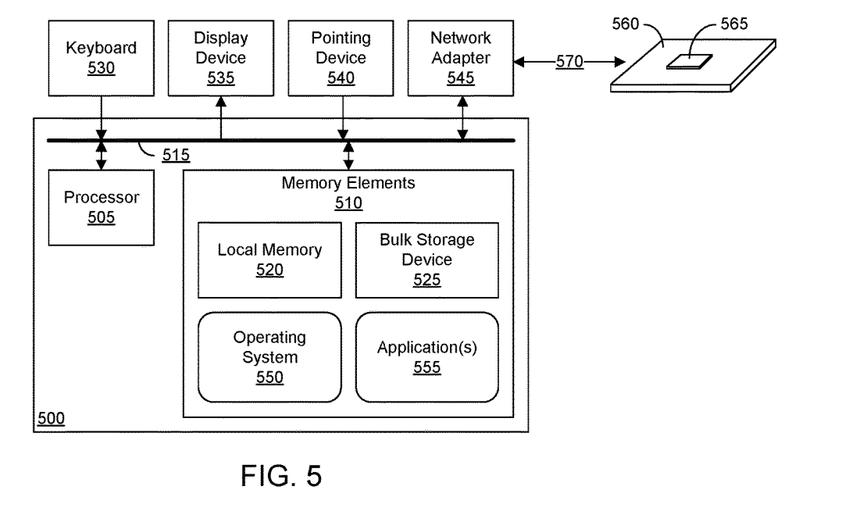
FIG. 5 illustrates an example data processing system.

FIG. 5 illustrates an example data processing system (system) 500. System 500 may be used to implement systems and/or devices that include a processor and memory and that are capable of performing the operations described within this disclosure. For example, system 500 may be used to implement a host system 102 as described herein in connection with FIG. 1. In another example, system 500 may be used to implement a computing system executing suitable program code to implement a hardware compiler as described herein in connection with FIG. 2.

As pictured, system 500 includes at least one processor 505 coupled to memory elements 510 through a system bus 515 or other suitable circuitry such as an input/output (I/O) subsystem. System 500 stores computer readable instructions (also referred to as "program code") within memory elements 510. Memory elements 510 may be considered an example of computer readable storage media. Processor 505 executes the program code accessed from memory elements 510 via system bus 515.

Memory elements 510 include one or more physical memory devices such as, for example, a local memory 520 and one or more bulk storage devices 525. Local memory 520 refers to non-persistent memory such as RAM generally used during actual execution of the program code. Bulk storage device 525 refers to persistent data storage device(s) and may be implemented as a hard disk drive (HDD), solid state drive (SSD), and so forth. System 500 may also include one or more cache memories (not shown) that provide temporary storage of at least some program code in order to reduce the number of times program code must be retrieved from bulk storage device 525 during execution.

System 500 may be coupled to one or more I/O devices such as a keyboard 530, a display device 535, a pointing device 540, and/or one or more network adapters 545. System 500 may include one or more additional I/O device(s) beyond the examples provided. The I/O devices described herein may be coupled to system 500 either directly or through intervening I/O controllers. In some cases, one or more of the I/O device(s) may be combined as in the case where a touch sensitive display device 535 (e.g., a touchscreen) is used. In that case, display device 535 may also implement keyboard 530 and/or pointing device 540.

Network adapter 545 is a communication circuit configured to establish wired and/or wireless communication links with other devices. The communication links may be established over a network or as peer-to-peer communication links. Accordingly, network adapter 545 enables system 500 to become coupled to other systems, computer systems, remote printers, and/or remote storage devices. Example network adapter(s) 545 may include, but are not limited to, modems, cable modems, Ethernet cards, bus adapters, connectors, and so forth. Network adapter 545 may be a wireless transceiver, whether a short and/or a long range wireless transceiver.

As pictured, memory elements 510 may store an operating system 550 and one or more application(s) 555. Application 555, for example, may be an electronic design automation (EDA) application. One example of an EDA application is a hardware compiler. In one aspect, operating system 550 and application(s) 555, being implemented in the form of executable program code, are executed by system 500 and, more particularly, by processor 505, to perform the various operations described within this disclosure. As such, operating system 550 and application 555 may be considered an integrated part of system 500. Operating system 550, application 555, and any data items used, generated, and/or operated upon by system 500 such as kernels, kernel circuit designs, binaries, configuration bitstreams, metadata, HLL source code, HDL, etc., are functional data structures that impart functionality when employed as part of system 500 or are provided to an IC 565 for implementation therein in a suitable format.

As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

System 500 may include fewer components than shown or additional components not illustrated in FIG. 5 depending upon the particular type of device that is implemented. In addition, the particular operating system and/or application(s) included may also vary according to device type as may the types of network adapter(s) included. Further, one or more of the illustrative components may be incorporated into, or otherwise form a portion of, another component. For example, a processor may include at least some memory.

In one or more example embodiments, system 500 may be coupled to a circuit board 560 through a communication link 570. For example, system 500, as noted, may implement a host system. In one example, system 500 may be coupled to circuit board 560 through network adapter 545. In another example, system 500 may include one or more other I/O devices such as Universal Serial Bus (USB) interface, or other communication port such as an Ethernet port and/or Peripheral Component Interconnect Express (PCIe) port that may be used to couple system 500 to circuit board 560.

Circuit board 560 may be a printed circuit board and have target hardware such as IC 565 coupled thereto. In one arrangement, IC 565 may be implemented as a programmable IC such as an FPGA, or an ASIC. IC 565 may implement a device as described herein. System 500 may be configured to provide or download a circuit design, e.g., a configuration bitstream specifying a kernel circuit design, to IC 565 as described herein in connection with FIG. 4. With the kernel circuit design loaded into IC 565, the kernel circuit is physically implemented within IC 565.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory and/or memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "hardware description language" is a computer-language that facilitates the documentation, design, and manufacturing of a digital system, such as an integrated circuit. A hardware description language, or HDL, combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high level programming languages, an HDL also includes an explicit notion of time, which is a primary attribute of a digital system.

As defined herein, the term "high level programming language" means a programming language, or set of instructions, used to program a data processing system. The instructions may have a strong abstraction from the details of the data processing system, e.g., machine language. For example, a high level programming language may automate or hide aspects of operation of the data processing system such as memory management. The amount of abstraction typically defines how "high level" the programming language is. Using a high level programming language frees the user from dealing with registers, memory addresses, and other low level features of the data processing system upon which the high level programming language will execute. In this regard, a high level programming language includes little or no instructions that translate directly, on a one-to-one basis, into a native opcode of a data processing system. Examples of high level programming languages include, but are not limited to, C, C++, SystemC, OpenCL, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "real time" means a level of processing responsiveness that a user or system senses as sufficiently immediate for a particular process or determination to be made, or that enables the processor to keep up with some external process. As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods of hardware acceleration. In one aspect, a method can include selecting, using a processor, a kernel, determining, using the processor, a clock frequency for the selected kernel, and programming, using the processor, a clock circuit to generate a clock signal having a clock frequency compatible with the selected kernel. The method can include implementing, using the processor, the selected kernel as a kernel circuit within a region of programmable circuitry, wherein the kernel circuit is clocked using the clock signal from the clock circuit having the compatible clock frequency.

In one aspect, the clock frequency for the selected kernel is different than a clock frequency for a different kernel available for selection by the processor.

Determining the clock frequency for the selected kernel can include reading the clock frequency from metadata included in a container file also including a binary of the selected kernel.

In another aspect, the metadata specifying the clock frequency is generated during hardware compilation of the selected kernel.

The method can also include comparing the clock frequency read from the metadata with a table of available clock frequencies for the clock circuit and selecting an available clock frequency from the table of clock frequencies as the compatible clock frequency based upon the comparing.

The method can include, responsive to determining that the kernel circuit is inactive, programming the clock circuit to generate the clock signal with a clock frequency lower than the compatible clock frequency.

In another aspect, the region of programmable circuitry is a dynamically reconfigurable region of programmable circuitry.

In another aspect, the clock circuit is implemented as a hardened circuit.

In another aspect, the clock circuit is implemented in a different region of programmable circuitry adapted for static operation.

The method can also include isolating the region of programmable circuitry prior to programming the clock circuit and implementing the kernel within the region; and, de-isolating the region of programmable circuitry responsive to programming the clock circuit and implementing the kernel within the region.

One or more embodiments are directed to systems for hardware acceleration. In one aspect, a system includes a region of programmable circuitry, a clock circuit configured to provide a clock signal to the region of programmable circuitry, and a processor configured to select a kernel and determine the clock frequency for the selected kernel. The processor may also be configured to implement the selected kernel within the programmable circuitry as a kernel circuit and program the clock circuit to generate the clock signal with a clock frequency compatible with the selected kernel for use in clocking the kernel circuit.

In one aspect, the clock frequency for the selected kernel is different than a clock frequency for a different kernel available for selection by the processor.

Determining the clock frequency for the selected kernel can include reading the clock frequency from metadata included in a container file also including a binary for the selected kernel.

In another aspect, the metadata specifying the clock frequency is generated during hardware compilation of the selected kernel.

The processor can be configured to perform executable operations further including comparing the clock frequency read from the metadata with a table of available clock frequencies for the clock circuit and selecting an available clock frequency from the table of clock frequencies as the compatible clock frequency based upon the comparing.

The processor can be configured to perform executable operations further including, responsive to determining that the kernel circuit is inactive, programming the clock circuit to generate the clock signal with a clock frequency lower than the compatible clock frequency.

In another aspect, the region of programmable circuitry is a dynamically reconfigurable region of programmable circuitry.

In another aspect, the clock circuit is implemented as a hardened circuit.

In another aspect, the clock circuit is implemented in a different region of programmable circuitry adapted for static operation.

The processor can be configured to perform executable operations further including isolating the region of programmable circuitry prior to programming the clock circuit and implementing the kernel within the region; and, de-isolating the region of programmable circuitry responsive to programming the clock circuit and implementing the kernel within the region.

One or more embodiments are directed to computer program products. In one aspect, a computer program product includes a computer readable storage medium having program code stored thereon. The program code is executable by a processor to perform operations including selecting, using the processor, a kernel, determining, using the processor, a clock frequency for the selected kernel, and programming, using the processor, a clock circuit to generate a clock signal having a clock frequency compatible with the selected kernel. The operations can include implementing, using the processor, the selected kernel as a kernel circuit within a region of programmable circuitry, wherein the kernel circuit is clocked using the clock signal from the clock circuit having the compatible clock frequency.

In one aspect, the clock frequency for the selected kernel is different than a clock frequency for a different kernel available for selection by the processor.

Determining the clock frequency for the selected kernel can include reading the clock frequency from metadata included in a container file also including a binary for the selected kernel.

In another aspect, the metadata specifying the clock frequency is generated during hardware compilation of the selected kernel.

The program code can be executable by a processor to perform executable operations including comparing the clock frequency read from the metadata with a table of available clock frequencies for the clock circuit and selecting an available clock frequency from the table of clock frequencies as the compatible clock frequency based upon the comparing.

The program code can be executable by a processor to perform executable operations including, responsive to determining that the kernel circuit is inactive, programming the clock circuit to generate the clock signal with a clock frequency lower than the compatible clock frequency.

In another aspect, the region of programmable circuitry is a dynamically reconfigurable region of programmable circuitry.

In another aspect, the clock circuit is implemented as a hardened circuit.

In another aspect, the clock circuit is implemented in a different region of programmable circuitry adapted for static operation.

The program code can be executable by a processor to perform executable operations including isolating the region of programmable circuitry prior to programming the clock circuit and implementing the kernel within the region; and, de-isolating the region of programmable circuitry responsive to programming the clock circuit and implementing the kernel within the region.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of hardware acceleration, comprising:
    selecting, using a processor, a kernel;
    determining, using the processor, a clock frequency for the selected kernel;
    programming, using the processor, a clock circuit to generate a clock signal having a clock frequency compatible with the selected kernel; and
    implementing, using the processor, the selected kernel as a kernel circuit within a region of programmable circuitry, wherein the kernel circuit is clocked using the clock signal from the clock circuit having the compatible clock frequency.

2. The method of claim 1, wherein the clock frequency for the selected kernel is different than a clock frequency for a different kernel available for selection by the processor.

3. The method of claim 1, wherein the determining the clock frequency for the selected kernel comprises:

reading the clock frequency from metadata included in a container file also including a binary of the selected kernel.

4. The method of claim 3, wherein the metadata specifying the clock frequency is generated during hardware compilation of the selected kernel.

5. The method of claim 3, further comprising:
comparing the clock frequency read from the metadata with a table of available clock frequencies for the clock circuit; and
selecting an available clock frequency from the table of clock frequencies as the compatible clock frequency based upon the comparing.

6. The method of claim 1, further comprising:
responsive to determining that the kernel circuit is inactive, programming the clock circuit to generate the clock signal with a clock frequency lower than the compatible clock frequency.

7. The method of claim 1, wherein the region of programmable circuitry is a dynamically reconfigurable region of programmable circuitry.

8. The method of claim 1, wherein the clock circuit is implemented as a hardened circuit or is implemented in a different region of programmable circuitry adapted for static operation.

9. The method of claim 1, further comprising:
isolating the region of programmable circuitry prior to programming the clock circuit and implementing the kernel within the region; and
de-isolating the region of programmable circuitry responsive to programming the clock circuit and implementing the kernel within the region.

10. A system for hardware acceleration, comprising:
a region of programmable circuitry;
a clock circuit configured to provide a clock signal to the region of programmable circuitry; and
a processor configured to select a kernel and determine the clock frequency for the selected kernel;
wherein the processor is configured to implement the selected kernel within the region of programmable circuitry as a kernel circuit and program the clock circuit to generate the clock signal with a clock frequency compatible with the selected kernel for use in clocking the kernel circuit.

11. The system of claim 10, wherein the clock frequency for the selected kernel is different than a clock frequency for a different kernel available for selection by the processor.

12. The system of claim 10, wherein the processor determines the clock frequency for the selected kernel by reading the clock frequency from metadata included in a container file also including a binary for the selected kernel.

13. The method of claim 12, wherein the metadata specifying the clock frequency is generated during hardware compilation of the selected kernel.

14. The system of claim 12, wherein the processor is configured to perform executable operations further including:
comparing the clock frequency read from the metadata with a table of available clock frequencies for the clock circuit; and
selecting an available clock frequency from the table of clock frequencies as the compatible clock frequency based upon the comparing.

15. The system of claim 10, wherein the processor is configured to perform executable operations further including:
responsive to determining that the kernel circuit is inactive, programming the clock circuit to generate the clock signal with a clock frequency lower than the compatible clock frequency.

16. The system of claim 10, wherein the region of programmable circuitry is a dynamically reconfigurable region of programmable circuitry.

17. The system of claim 10, wherein the clock circuit is implemented as a hardened circuit or is implemented in a different region of programmable circuitry adapted for static operation.

18. The system of claim 10, wherein the processor is configured to perform executable operations further including:
isolating the region of programmable circuitry prior to programming the clock circuit and implementing the kernel within the region; and
de-isolating the region of programmable circuitry responsive to programming the clock circuit and implementing the kernel within the region.

19. A computer program product comprising a computer readable storage medium having program code stored thereon, the program code executable by a processor to perform operations comprising:
selecting, using the processor, a kernel;
determining, using the processor, a clock frequency for the selected kernel;
programming, using the processor, a clock circuit to generate a clock signal having a clock frequency compatible with the selected kernel; and
implementing, using the processor, the selected kernel as a kernel circuit within a region of programmable circuitry, wherein the kernel circuit is clocked using the clock signal from the clock circuit having the compatible clock frequency.

20. The computer program product of claim 19, wherein the clock frequency for the selected kernel is different than a clock frequency for a different kernel available for selection by the processor.

* * * * *